July 10, 1934.  C. W. VOGT  1,965,617

METHOD AND APPARATUS FOR PROCESSING MATERIALS

Filed Nov. 1, 1930  4 Sheets-Sheet 1

INVENTOR
*Clarence W. Vogt*
BY
ATTORNEYS

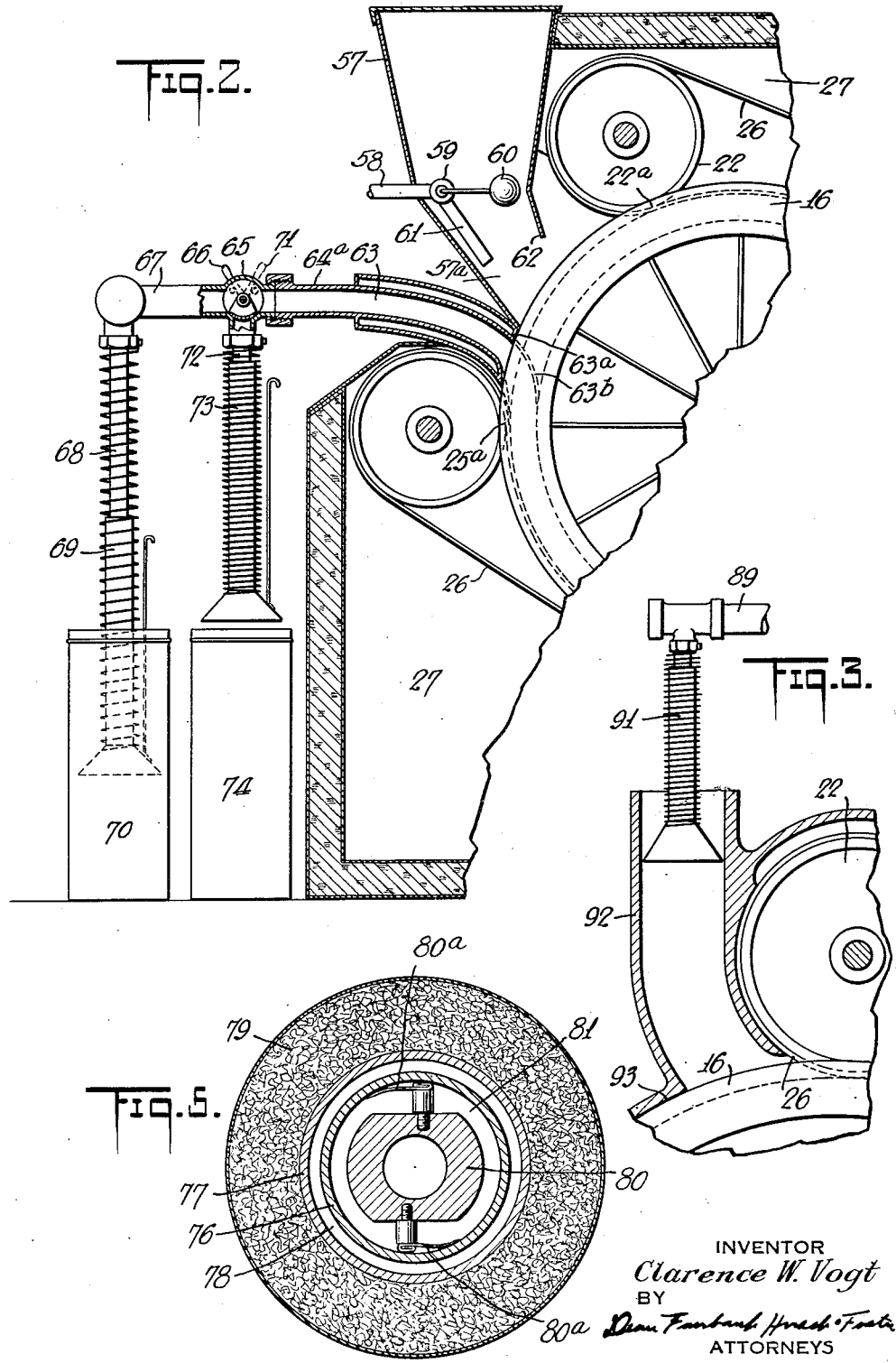

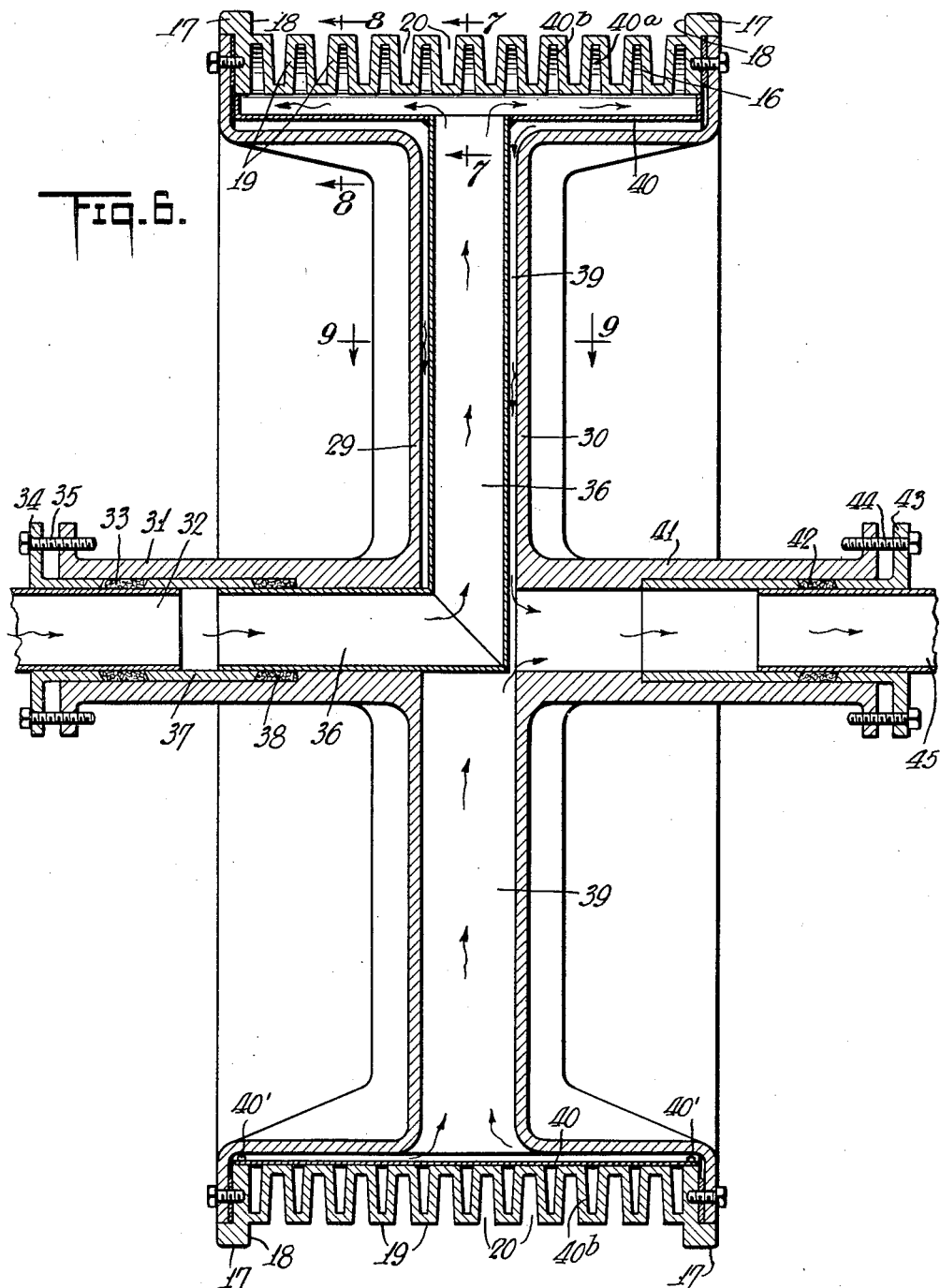

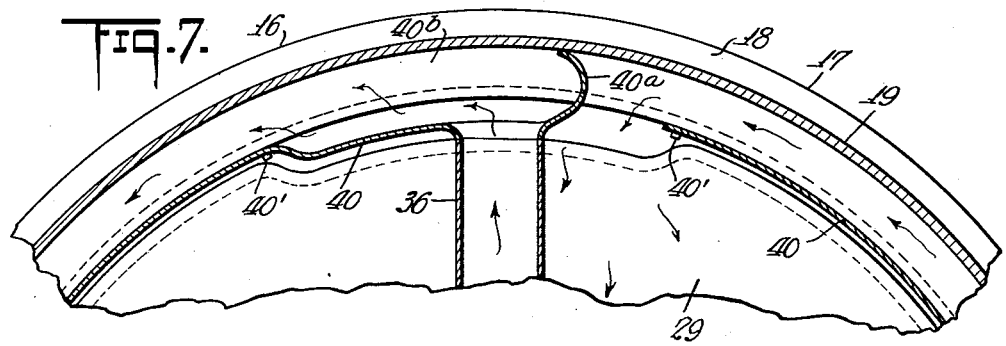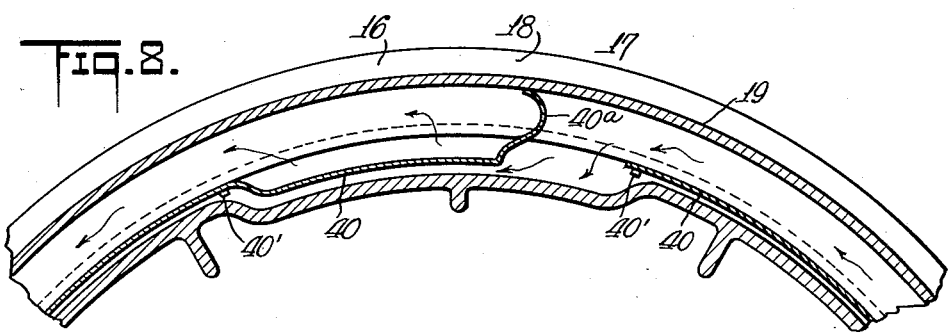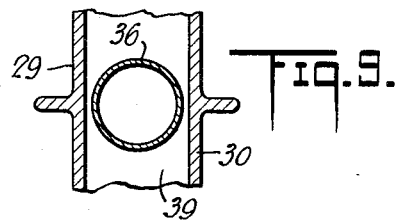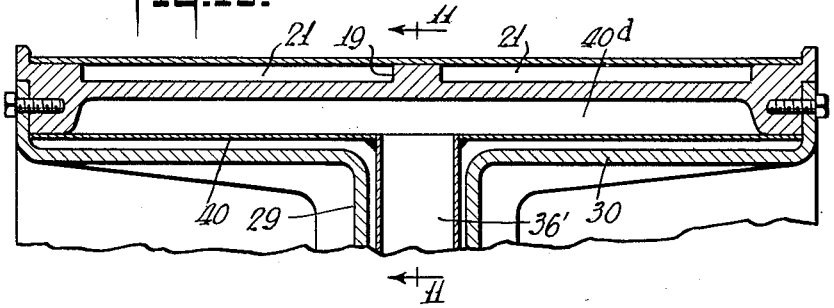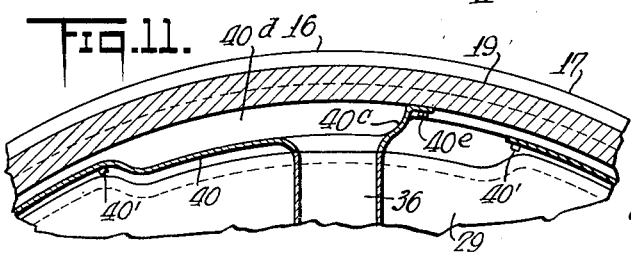

Patented July 10, 1934

1,965,617

UNITED STATES PATENT OFFICE 1,965,617

METHOD AND APPARATUS FOR PROCESSING MATERIALS

Clarence W. Vogt, Louisville, Ky., assignor, by mesne assignments, to Vogt Processes, Incorporated, Louisville, Ky., a corporation of Delaware Application November 1, 1930, Serial No. 492,727

24 Claims. (Cl. 62—174)

This invention relates to methods and apparatus for processing liquid, semi-liquid, or plastic materials or mixtures to increase the stiffness of the material, for instance, by causing the crystallization or solidification of a portion of the ingredients.

In the solidifying or partial solidifying of certain liquid, semi-liquid, or plastic materials, agitation is not essential, and in the processing of certain materials, such as ice cream, after a certain state of stiffness is reached, it is essential to cease rapid agitation, in order to prevent loss of overrun and damage to the product. In processing various commodities, however, it is highly desirable to effect a further stiffness or hardening or setting of the product as rapidly as is practicably possible without causing undue agitation or disturbance of the product.

In connection with the freezing of eggs and fruit juices, it is desirable to effect the freezing from a liquid to a plastic state as quickly as practicable, both from a quality as well as a cost standpoint. However the extreme minuteness of crystal sizes is not so essential with these products as it is with ice cream or confections, as the former class of materials unlike the latter class are not melted in the mouth of the consumer, but are usually melted prior to human consumption. Further, in connection with the freezing of eggs and fruit juices, it is desirable that the oxidizing effect of air be eliminated to as great an extent as possible, and therefore freezing apparatus of the type disclosed in my prior Patent 1,733,740, used alone or in combination, is not suitable because air cannot conveniently be excluded. The same applies to single roll apparatus commonly used in the chilling of animal and vegetable oils.

While the methods and apparatus shown in my Patents 1,810,740 and 1,810,863, issued June 16, 1931, and Patent 1,827,629, issued October 13, 1931, may be used to advantage in connection with the forming, packaging and freezing of ice cream and other commodities, the present invention discloses advantages in the processing of certain commodities as will be evident from the drawings and the following description thereof.

This invention involves methods and apparatus suitable for chilling or freezing liquid material under agitation until these products reach a certain degree of stiffness, and thereafter further chilling or freezing such partially chilled or frozen liquid or semi-liquid in a confined but unagitated state and in a continuous manner, and thereafter forming and/or wrapping and/or packing and/or packaging the same without intermediate exposure to the air or release of superatmospheric pressure.

Another object of the invention is the provision of a method and means whereby a liquid, semi-liquid or plastic material may be chilled, cooled, frozen or solidified by setting without concurrent agitation, and while in a confined layer, column or channel, and also whereby the material in such a layer, column or channel may be reformed with the minimum of distortion and mulling into a relatively thicker column, layer, channel or other form.

A further object is to provide novel and effectively simple means whereby such unagitated chilling, cooling, freezing or solidification may take place under greater than atmospheric pressure and/or with the exclusion of the adjacent atmosphere.

A further object is to provide an apparatus which may be used for chilling, freezing or hardening of prepackaged goods, and whereby the increased effectiveness of the refrigerant is obtained by the use of an automatically adjustable, flexible belt to grip and hold such packages in firm engagement with a refrigerated conveyor, and subsequently to automatically release such packages at the unloading station.

A further object is to utilize the hardened, solidified or crystallized material rather than any mechanical part to force out the processed material and to hold back the incoming material. As an important feature of the apparatus for accomplishing this object I provide coacting substantially parallel parts movable together to define therebetween an open channel or passageway for the material. Without processing, liquid might flow freely lengthwise of and along the channel and flow out under a pressure determined by the pressure exerted at the inlet. In the processing there is such a progressive reduction in viscosity or fluid condition that the movable parts defining the channel may force out the material under higher or lower pressure than that of the supply and the supply is dammed back by the wholly or partly solidified material toward the delivery end of the channel.

A further object is to facilitate the work of attendants by permitting the loading and unloading to be observed or performed by an attendant outside of the refrigerated chamber.

While the invention is particularly adapted to handling materials of a plastic or semi-plastic nature without the same having been previously packaged, it will also be understood that the apparatus is suitable for handling packages and especially packages which are relatively narrow in width. The limitation of width is mentioned as it will be obvious that a wide package would be more noticeably curved to conform to the contour of the annular space provided between the belt and the roll and unless the rolls are very large in diameter this curvature would tend to buckle, bend or distort a package of very considerable width. This, however, would be unnoticeable on a package of relatively narrow width, for instance, in which the width of the package is not in excess of 10° or 1/36 of the total circumference of the roll.

It has heretofore been proposed to refrigerate, chill or freeze such packages while conveying them between a pair of superposed endless belts which are subjected to the refrigeration. Such type of apparatus must of necessity occupy considerable length of space in proportion to the amount of material being handled, or in proportion to the head room, especially if the packages are maintained at a few inches of thickness in order to effect sufficiently rapid chilling, cooling, or freezing, and requires adjustment for varying heights of packages.

In the accompanying drawings I have illustrated certain of the forms which my invention may assume, but other forms may be easily designed.

In these drawings:

Fig. 2 is a central vertical section of a portion of a similar apparatus, adapted to discharge the material in a plastic or semi-plastic state directly into containers or cans.

Fig. 3 is a central vertical section of a portion of a similar apparatus with a different type of hopper for feeding the material.

Fig. 5 is a transverse section through one of the heat transfer units shown diagrammatically in Fig. 4 and taken on the line 5—5 of the same figure on a larger scale.

Fig. 6 is a central longitudinal section of one type of roll with multiple corrugations or channels, the belt being removed.

Fig. 7 is a partial vertical section taken on the line 7—7 of Fig. 6, showing one way of attaching the baffle to the multi-channel-shaped roll.

Fig. 8 is a similar view of Fig. 7 taken on the line 8—8 of Fig. 6.

Fig. 9 is a partial section taken on the line 9—9 of Fig. 6.

Fig. 10 is a partial section similar to a part of Fig. 6, but showing a different form of roll with which the flexible belt forms wider and, if desired, thinner channel shaped spaces, and Fig. 11 is a partial cross-section taken on the line 11—11 of Fig. 10 showing one way of attachment of the baffle.

Figure 1:
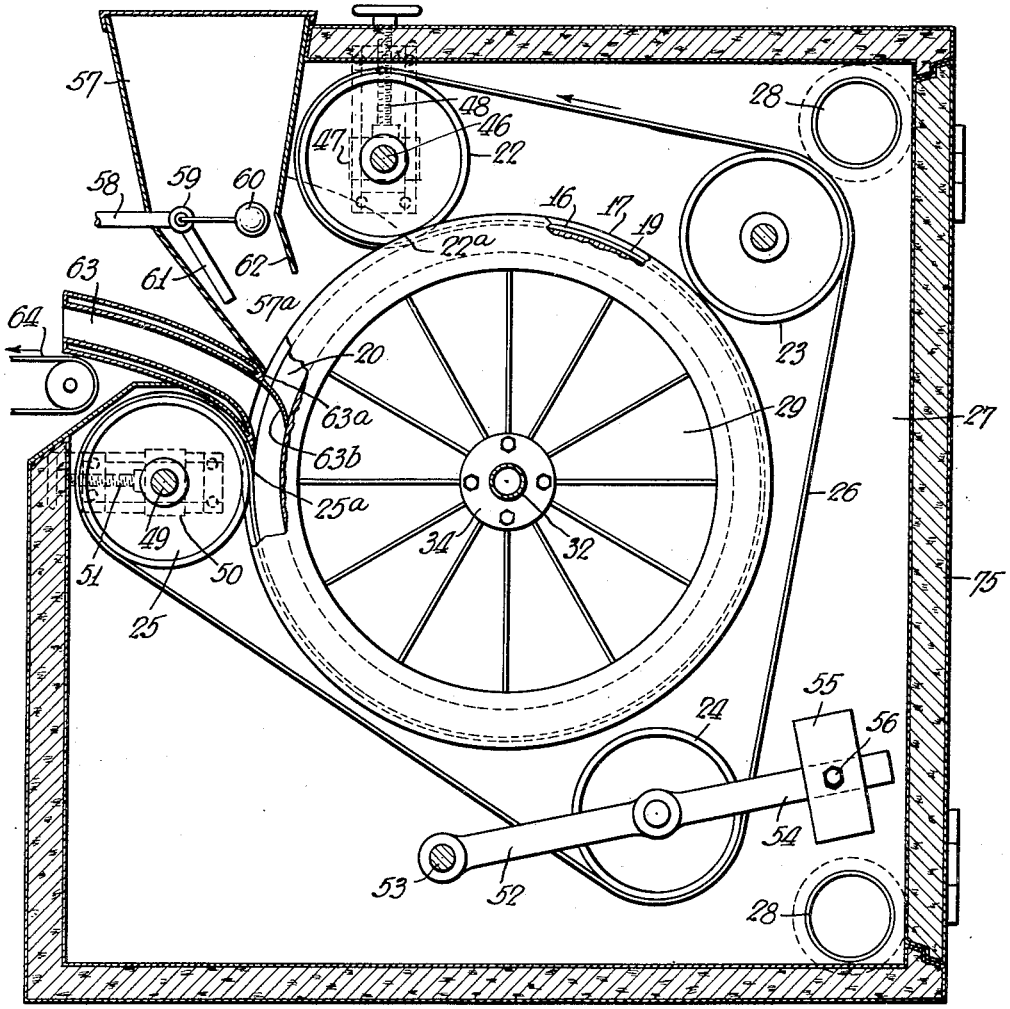
Fig. 1 is a central vertical section of one form of apparatus in which my novel method may be carried out.

In the present invention I provide an internally cooled or refrigerated drum or conveyor 16 which is provided with peripheral flanges 17 at the ends, the opposed surfaces 18 of which act as guides for the edges of a belt. Between these flanges 17 are flanges 19 which act as bridges between the annular spaces 20 for the material or packages. The peripheral surfaces engage the surface of the belt and are of sufficient width to prevent the belt from sagging or entering the annular spaces or channels 20 shown in Fig. 6 and 21 shown in Fig. 10.

The drum or roll 16 is trunnioned on a suitable frame, not shown, which frame may also support a belt carrying forming pulley 22, an idler pulley 23, a tension pulley 24, and a drive pulley 25. Around these pulleys extends a flexible belt 26 and movable in the direction shown by the arrows in Fig. 1. This belt may be of metal or in some cases of fabric, rubber or any other flexible material. This belt will be maintained tight against the surfaces of the flanges 19 by the resistance to rotation of the drum 16 and also by the resistance to the packing or forming required by the filling devices if such devices be used.

In the specific form illustrated the belt 26 is enclosed in an insulated chamber 27 which may be supplied with a heated or cooled gas by means of the ducts 28, one of which serves as an inlet, and the other as an outlet. These ducts connect the chamber 27 with a cooler or heater of the usual type, not shown. This cooler or heater preferably includes a circulating device, such as a fan or blower for causing a rapid flow of cooled or heated gas into and out of the chamber 27. As the belt is heated or cooled by the fluid in the chamber 27, it will be noted that the material travels with and between opposed heat transfer walls.

In case it is desired to prevent the material from contacting with atmospheric air, another gas such as helium may be employed, and by the maintenance of such gas at slightly higher than the surrounding atmospheric pressure, there would be no influx of air into the chamber. One advantage in the use of helium in addition to its non-oxidizing quality is its greater heat transfer rate per unit of time, per unit of surface, per degree temperature difference. Its use also serves to increase the rate of heat flow to or from the chamber and the material under treatment.

The drum 16 is provided with enclosing ends 29 and 30 which are of such shape as to eliminate excessive volume of the heating or cooling fluid. The end 29 is provided with a hollow trunnion 31 for receiving the inlet pipe 32 for the heating or cooling medium. This pipe projects a sufficient distance into the trunnion to permit the packing thereof by suitable packing 33, packing gland 34 and gland bolts 35. Projecting into this trunnion, but from the opposite end is a delivery conduit 36 having a radially extending portion between the ends 29 and 30. Between the inlet pipe 32 and the delivery conduit 36 is a metallic sleeve 37 and surrounding the conduit 36 and a short distance from its end is a second packing 38. Applying of pressure to gland 34 by means of bolts 35 causes a sealing of both of the packings 33 and 38. The packing 33 serves to prevent the leakage of heating or cooling fluid into the chamber 27, or to the atmosphere, and the packing 38 serves to prevent the leakage of fluid around the delivery pipe 36 and into the space 39 between the ends 29 and 30.

The delivery conduit 36 connects with a circumferentially extending baffle 40 spaced a short distance from the periphery of the drum 16 so as to form a passage for the distribution of the heating or cooling liquid along the interior surface of the drum. Fingers 40a are connected to one end of the baffle 40 and extend into the grooves 40b formed in the inner surface of the drum 16 between the flanges 19. They form therewith a seal or partition in the passageway to force the liquid to flow in the direction shown by the arrows of Figs. 6, 7 and 8.

On the form shown in Figs. 10 and 11 this sealing is effected by a flange 40c which extends in a space 40d and is fastened to the inside surface of the drum 16 by means of screws 40e. In other respects the circulation in the two types of drums is similar, and as herein described.

The baffle 40 is fastened to the interior of the drum 16 by means of suitable screws 40' and serves to confine the heating or cooling fluid adjacent the interior periphery of the drum 16 so as to cause a rapid turbulent circulation of such liquid, thereby causing the greatest heat transfer rate between said liquid and the drum surface. The baffle 40 does not extend completely around the interior periphery of the drum, but ends a short distance from the fingers 40a, as shown in Figs. 7, 8 and 11. This provides egress for the heating or cooling liquid which is then forced through the space 39 and into the hollow trunnion 41 of the end plate 30. This hollow trunnion 41 is provided with packing 42, gland 43 and bolts 44 which serve to prevent the leakage of the outgoing heating or cooling liquid from around the outlet pipe 45.

It will be understood that the inlet pipe 32 and outlet pipe 45 are preferably held stationary, while the drum and its fittings are rotated.

The inlet pipe 32 is supplied with the desired temperature changing medium from any suitable source, not shown, and the outlet pipe 45 preferably returns such medium to its source. In the case where a refrigerant such as brine is employed, the inlet pipe is connected to the discharge from a brine cooler and the outlet pipe is connected to return the refrigerant from the drum to the brine cooler for recooling or recirculation.

It will be noted that the drum 16, together with the flanges 17 and the belt 26, forms a plurality of confined or enclosed spaces 20 or 21 from the point 22a to the point 25a measured in clockwise direction between the pulleys 22 and 25.

The forming pulley 22 is mounted on a shaft 46 which in turn is adjustable with relation to the drum 16 by means of the pulley adjusting frame 47 and screw and wheel 48.

Similarly the drive pulley 25 is mounted on shaft 49 which is preferably driven by suitable motor and reduction gears, not shown, and is likewise adjustable in relation to the drum 16 by means of the pulley adjusting frame 50 and screw and wheel 51.

As these take-up members are of the usual form well known in the art, they are shown somewhat diagrammatically in Fig. 1.

The tension pulley 24 is mounted on a suitable shaft carried by a frame 52 which is trunnioned or pivoted on shaft or support 53. The frame 52 is provided with extensions 54 on which are mounted weights 55, adjustable along the extensions 54 so that if a greater or lesser tension is desired on the belt 26, this may be obtained by merely moving the weights 55 to the desired position, and locking them in such position by means of set screws 56. In this manner any desirable tension may be secured and maintained, and also there is provided a compensating means for any normal stretching of the belt 26 which may take place during the continued use and operation of the machine.

In Figs. 1 and 2 I have shown a feed hopper 57 through which extends, in liquid tight relationship therewith, an inlet pipe 58. This pipe has the usual type of float valve 59 and float 60 for maintaining the desired head of liquid or semi-liquid material supplied to the drum. From the float valve 59 and outlet pipe 61 projects downwardly so as to permit inflowing material to enter the hopper at a point below the normal liquid level so as to prevent contact of this liquid with the atmosphere. For the same purpose, the rear face of the hopper is extended well below the normal liquid level as shown at 62, the purpose being to serve as a seal to prevent the escape of gas within the chamber 27. The other side extends to the periphery of the drum at 63a. The other two sides 57a of this hopper 57 extend and conform to the arcuate space between 22a and 63a in a liquid tight manner to prevent the leakage of liquid from the hopper 57. Where the material is delivered through a conduit, the hopper may be provided with a cover to prevent access of air to the material being processed.

The material is fed in from the hopper and is carried around by the drum 16 and belt 26 until it reaches a point 25a where the belt leaves the drum. There it is collected by a conduit 63 serving to mold all of the separate columns or layers between the flanges of the drum into a single body.

It will be understood that this conduit or molder 63 is jacketed by means of a surrounding wall, leaving a space which may serve for a heating or cooling liquid, or may be left empty, to provide a heat insulation for the molder. The inlet and outlet connections to and from this jacket are not shown as they consist of the usual pipe connections or they may consist of electric wires and heating elements of the usual type depending upon the nature of the material being treated as to its resistance to movement and the temperature at which the material is discharged.

The upper wall of the conduit or molder has fingers 63b extending into the spaces 20 or 21 to serve as knives for removing the processed material and to separate it from the incoming unprocessed material.

In Fig. 1 I have shown this molder delivering onto a carrying off mechanism 64. This may be of the usual belt and pulley type of conveyor or any other suitable type of mechanism, and it may be timed in connection with a cutting mechanism to cut the delivered material into suitable lengths, such as the mechanism disclosed in my Patent No. 1,810,740.

In Fig. 2 I have shown this molder or collecting header with an extension 64a to which is connected in liquid tight relationship a two way can filler valve 65. This can filler valve is operated by a handle 66, and in the position shown the material flowing through the header 63 is being delivered through conduit 67 and the telescoping can filler sections 68 and 69 directly into the can or other container 70, which is shown approximately half full. When this valve handle 66 is moved to its other position shown in dotted lines at 71 the valve will deliver material through a telescoping filling mechanism 72 and 73 directly into a can or container 74. This type of telescoping can filler is similar to that disclosed in the Vogt & Wymond copending application 402,362. The material may be then transferred to a cold room for further freezing or chilling.

While in the drawings I have shown the chamber 27 to be not much larger than to properly enclose the mechanism herein described, but it will be understood that this chamber may be a part of a large space and may contain a battery of units herein described. In this case the door 75 and the ducts 28 would not be required, provided the chamber itself contained any necessary heating or cooling medium and/or circulating means and/or suitable entrance.

The apparatus hereinbefore described may be used in connection with a primary heat transfer unit of any suitable design, which for instance, may be constructed as shown in any one of my Patents 1,783,864, 1,783,865 or 1,783,867, dated December 2, 1930. In such a unit the material may be subjected to the required refrigeration or heating, while advanced as a comparatively thin layer and while beaten, agitated or whipped in such layer.

In Fig. 5 there is illustrated a section through such a unit. The material is caused to flow lengthwise through a tube 76 which is encircled by an outer tube 77 to provide an annular space 78 for the refrigerating or heating medium. This medium may be either brine, ammonia, water or other fluid, and its temperature will be controlled in accordance with the character of the material treated. Outside of the tube 77 is an insulating jacket 79 to prevent heat losses during rotation. Inside of the tube 76 is a shaft 80 of an external diameter nearly as great as the internal diameter of the tube 76 so as to leave a comparatively thin annular space 81 through which the material to be processed is caused to flow. The thickness of this annular space may vary depending upon the character of the material treated, but for ordinary material such as ice cream, fruit juices, margarin or the like, the space is preferably not greater than $\frac{1}{16}$ inch in thickness. The shaft 80 carries one or more whipping, agitating, or scraper blades 80a disposed adjacent to the inner surface of the tube 76.

The present invention does not reside in the specific character or details of these blades which are more fully described in copending application Serial No. 488,808 and broadly claimed in the Vogt and Miller Patent 1,847,149, dated March 1, 1932.

Figure 4:
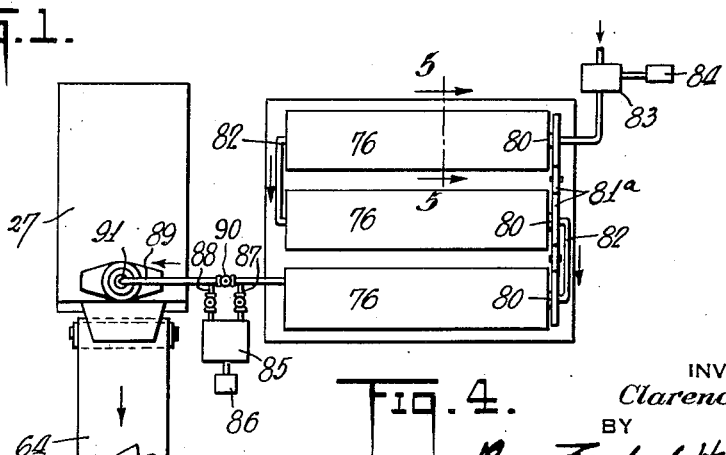
Fig. 4 is a diagrammatic representation of a plurality of heat transfer units provided with mechanical agitating means and connected for delivery to an apparatus of the type shown in Figs. 1 and 3.

Preferably there are employed a plurality of tubes 76 connected together in series as shown in Fig. 4. All of these tubes may be mounted in a single casing and insulating jacket as illustrated in Patent 1,783,865, dated December 2, 1930, but to simplify illustration in the present case I have shown the tubes mounted side by side with the ends of the shafts 80 connected by a train of gears 81a so that the shafts are simultaneously rotated at the proper desired speed. The tubes are shown connected together in series by conduits 82 which in practice may be insulated to prevent heat losses.

This apparatus through which the material is forced at high speed while being subjected to intense heat transfer and violent agitation, is shown in Fig. 4 as connected in series with the drum and belt mechanism herein before described. The material is delivered to the primary unit by a pump 83 which may be driven by a suitable motor 84. The pump is a material admission pump and may serve as a combined fluid pump for air or other gas which is to be delivered to the liquid. It may also serve as a mixing and proportioning pump if two or more liquids or other liquids are employed, and if solid material is fed within the liquid. A pump of this general character is illustrated in my Patent 1,902,315, issued March 21, 1933.

Between these units and the drum and belt apparatus hereinbefore described there may be employed a pump 85 driven by suitable motor 86 for drawing the material from the primary units and supplying it to the drum and belt unit, or for adding a gas or other material, such as fruit or nuts.

This pump is preferably of the type illustrated in my Patent 1,902,346, issued March 21, 1933. The pump has valve controlled inlet and outlet conduits 87 and 88 connected to a transfer line 89 between the units and upon opposite sides of a valve 90. This valve which is not illustrated in detail may be of any suitable type, but is preferably a combined stop and check valve. If the pump 85 is not required the valve 90 may be left open.

The transfer line 89 may discharge into a telescoping filling mechanism 91 such as that shown in Fig. 3. This mechanism is similar to the can filler mechanism hereinbefore described and referred to, and is particularly adapted for forcing a plastic or semi-plastic material into a chamber or container under sufficient pressure to cause the material to fill the chamber without encasement of voids. The material flowing from the filling mechanism 91 is discharged into the hopper 92 where it is caught and carried along by means of the surfaces of the drum 16 and the belt 26.

It will be noted that the hopper 92 is provided with a sealing flange 93 to prevent the escape of the material. This hopper is provided with side sealing walls as described in connection with Fig. 1.

With the arrangement as outlined in Fig. 4 and as shown in detail in Fig. 3, it will be seen that there is thus provided a mechanism for forcing a liquid, plastic, or semi-plastic material under superatmospheric pressure through a heat transfer apparatus in which agitation is present, and directly into and through a secondary heat transfer mechanism in which there is relatively limited, if any, agitation, and directly from such an apparatus into a container.

In the apparatus shown in Figs. 1 and 2 a liquid or semi-liquid material may be moved into heat interchanging relationship with a refrigerated or heated surface, and thereafter forced through a closed conduit under superatmospheric pressure directly into a container, or forced through a molder or former to change its contour, shape or dimensions.

In the embodiment of the invention more particularly shown in Figs. 1 and 2 it will be readily understood that this apparatus may be used as a pump for increasing the pressure on the material by chilling, hardening or freezing the same as it is moved in a confined passageway or container and/or layer, and the resistance to movement set up in the chilled or partially solidified material may be used to accomplish such forming, molding or filling, or for any other desired and useful purpose.

While I have shown diagrammatically the use of the apparatus particularly in combination with a primary processing unit or units, such as disclosed in my previous inventions, it will be understood that I do not in any manner intend to limit its use to such combination. On the contrary the herein disclosed methods and apparatus may be readily and advantageously used with or without any other primary heating, cooling, chilling, or processing unit or units.

If packaged goods are to be processed the hopper would be appropriately changed or suitable feed mechanism be provided for delivering the packages to the surface of the drum where they will be caught and carried around by the belt. The space between the drum and the belt should be such that the belt will press the packages against the heat transfer surfaces.

The herein described apparatus is particularly adapted for chilling material such as plastic cream, which is already in a satisfactory state of suitable emulsion after it has been separated by centrifuging while held at a temperature above the melting point of the fat content, its use in this case being to effect the rapid chilling with the minimum of agitation.

There is no apparatus available to my knowledge which will accomplish rapid chilling in the confined passageway without appreciable agitation of the material as all such types of apparatus heretofore proposed are rendered quickly inoperative where effective agitation is not employed to continually scrape the surface on which the solid particles are forming.

In the herein disclosed invention these solids are not removed until the chilling has been completed or at least completed to a satisfactory degree.

It will be further noted that the employment of the herein disclosed apparatus permits the chilling and/or cooling or freezing of liquid or semi-liquid materials at superatmospheric pressure and/or chilling, cooling or freezing without either the active cooling surfaces or the material undergoing treatment, being exposed to air or other undesirable gas.

While I have specifically described the herein method and apparatus as particularly applicable for the processing of certain materials, it will be understood that I do not limit myself to any particular material or materials or to any particular temperature or temperature range of treatment.

It will be understood that with some materials, for instance, plastic cream, the confined space may be held to a very thin film or layer, whereas with other materials in which uniformity of degree of treatment, or speed of cooling, is not essential or desired, the space may be wide or thick.

The speed of travel of the belt will, of course, be so controlled in respect to the material treated, the thickness of the layer, film or channel and the temperature of the temperature changing medium as to bring the material to the desired state at the delivery end.

Having thus described my invention, what I claim as new and desire to secure by Letters Patent is:

1. The method of refrigerating a material to effect crystallization of at least a portion thereof, which includes causing the material to flow in a comparatively thin confined layer, subjecting it to the action of a temperature changing medium while in said layer, mechanically agitating the material in said layer, and advancing the material through a second comparatively thin confined layer but in a substantially quiescent state.

2. The method of refrigerating a material to effect crystallization of at least a portion thereof, which includes subjecting the material to the action of a refrigerating medium, simultaneously agitating the material, thereafter advancing the material in a quiescent state in a comparatively thin confined layer, and subjecting it to further refrigerating action in said layer.

3. An apparatus for treating a liquid or semi-liquid material to change its condition, which includes a rotatable refrigerated drum, an endless belt mounted to move in parallelism with a portion of the periphery of the drum to form a comparatively thin, laterally confined, open ended space, and means for rotating said drum to advance the material in said space at substantially the same rate as the rate of movement of the drum surface and belt.

4. An apparatus for treating a liquid or semi-liquid material to partially crystallize the same, which includes a rotatable refrigerated drum, an endless belt mounted to travel in parallel juxtaposed relationship to a portion of the periphery of the drum to form therewith an open ended, arcuate passage, means for delivering the material to one end of said passage, the partially crystallized material being forced from the opposite end of the passage by the engagement of the drum surface and belt with said partially crystallized material.

5. An apparatus for treating a liquid or semi-liquid material to change its condition, which includes a refrigerated drum, an endless belt mounted to travel in parallel juxtaposed relationship to a portion of the periphery of the drum to form therewith an open ended, arcuate passage, means for delivering the material directly into contact with the surfaces of the drum and belt at one end of said passage, and means for removing the partially crystallized material from the opposite end of the passage.

6. An apparatus for treating a liquid or semi-liquid material to change its condition, which includes means for maintaining a supply of the liquid under a substantially constant head, means for progressively bringing together successive portions of a plurality of endless conveyor elements to form an elongated passageway open only at its ends, means for subjecting one of said elements to the action of a refrigerating medium, and means for delivering the material from said passageway under pressure by the advancing action of said conveyor elements and under a pressure independent of the head of the source of supply.

7. An apparatus for treating material to change its condition, including a plurality of heat transfer surfaces one substantially inflexible and the other flexible, said surfaces being juxtaposed to form a confined, elongated, passageway open only at its ends, means for delivering the material to one end of said passageway, and means for moving said surfaces to thereby advance the material.

8. An apparatus for treating liquid or semi-liquid materials, including means for advancing the material in a comparatively thin, confined space, means for mechanically agitating and chilling the material in said space, a conduit of substantially uniform cross-sectional area, means for delivering the material from said space to said conduit, and means for heating said conduit to facilitate the movement of the material therethrough.

9. An apparatus for treating a liquid or semi-liquid material, including means for advancing the material in a comparatively thin, confined space, means for mechanically agitating the material in said space, and means for thereafter advancing the material through a second comparatively thin, confined space in a quiescent state.

10. An apparatus for the treatment of a liquid or semi-liquid material to change the condition thereof, including means for partially freezing the material, means for mechanically agitating the material during the freezing operation, means for thereafter advancing the material in a comparatively thin, confined layer in a quiescent state, and means for further refrigerating the material in said layer.

11. An apparatus for the treatment of a liquid or semi-liquid material to change the condition thereof, including a drum having a peripheral groove, a belt coacting with the periphery of said drum along a substantial circumferential portion to form therewith an arcuate passage, means for delivering the material to said passage at one end of the latter, and means for changing the temperature of the material during its movement lengthwise of and with said passage.

12. An apparatus for changing the temperature of a material, including a drum having a circumferential groove, a belt extending along a considerable portion of the periphery of the drum over said groove to form an arcuate passage, means for delivering material to said passage at one end thereof, means for delivering the material from the other end of the passage, and means for changing the temperature of the material in said passage.

13. An apparatus for the treatment of material to change the condition thereof, including a drum having a plurality of circumferential grooves for the material, means for interiorly refrigerating said drum, a pair of belt pulleys juxtaposed to said drum in spaced relationship, and a belt extending around said pulleys and covering said grooves along a substantial portion of the length thereof.

14. An apparatus for the treatment of material to change the condition thereof, including a drum having a plurality of circumferential grooves for the material, a pair of belt pulleys juxtaposed to said drum in spaced relationship, a belt extending around said pulleys and covering said grooves along a substantial portion of the length thereof, and means for circulating a refrigerant within said drum.

15. An apparatus for the treatment of material to change the condition thereof, including a drum having a plurality of circumferential grooves, a pair of belt pulleys juxtaposed to said drum in spaced relationship, a belt extending around said pulleys and covering said grooves along a substantial portion of the length thereof, and means for circulating a refrigerant within said drum in a circumferential direction to chill the material within said grooves.

16. An apparatus for refrigerating a liquid or semi-liquid material, including a hopper, means for maintaining a substantially constant level of liquid therein, a rotatable drum below said hopper, a belt extending along a considerable portion of the periphery of said drum from said hopper and forming therewith a passage for the material, and means for refrigerating the material in said passage.

17. An apparatus for refrigerating a liquid or semi-liquid material, including a hopper, means for maintaining a substantially contant level of liquid therein, a rotatable drum below said hopper, a belt extending along a considerable portion of the periphery of said drum from said hopper and forming therewith a passage for the material, means for refrigerating the material in said passage, a chamber enclosing said drum, and means for maintaining said chamber under superatmospheric pressure.

18. An apparatus of the character described, including a chamber, a rotatable drum disposed therein, a belt having a run extending adjacent to and parallel with a considerable portion of the periphery of the drum and forming therewith a passage for the material to be treated, means for delivering the material to said passage, and means for circulating a refrigerating medium in said chamber and in contact with said belt and said drum.

19. An apparatus for the character described, including a rotatable drum, a belt having a run extending along a considerable portion of the periphery of said drum and forming therewith a passage for the material to be treated, means for delivering material to said passage at one end thereof while protecting the material from contacting with the outside air, a receiving vessel, and means for delivering the material from said passage to said vessel without substantial contact with the outside air.

20. An apparatus for treating material to effect solidification of at least a portion thereof, including a heat transfer surface, means for refrigerating said surface, means for confining the material in a comparatively thin layer adjacent to said surface, means for advancing said surface to thereby advance the material, means for continuously removing the material from said surface, and means for forming the solidified material to a predetermined cross-sectional area.

21. An apparatus for treating material to effect solidification of at least a portion thereof, including a drum having a plurality of annular peripheral grooves, a belt having a run substantially parallel to the periphery of the drum and coacting with said grooves to form a plurality of separate passages, means for changing the temperature of the material in said passages, a delivery conduit, and means for scraping the material from all of said grooves and directing it into said conduit.

22. An apparatus for treating a liquid or semi-liquid material to effect solidification of at least a portion thereof, including an internally refrigerated rotatable member having a plurality of annular peripheral grooves, a second member cooperating therewith to close the outer sides of said grooves along a substantial portion of the length thereof, means for delivering liquid or plastic material to said grooves at one point on the periphery of said rotatable member, whereby the material is continuously advanced by the rotation of the drum and confined in said grooves, and a conduit having tongues projecting into said groove for removing the material therefrom and delivering it under pressure.

23. An apparatus for treating a liquid or semi-liquid material to effect solidification of at least a portion thereof, including an internally refrigerated rotatable member having a groove on the periphery thereof of materially greater depth than width, a second member extending along the periphery of said rotatable member and cooperating therewith to close the outer side of said groove, means for delivering material into said groove whereby it is advanced by the groove and substantially solidified therein, and a conduit having a scoop portion projecting into said groove for removing the material therefrom and directing it into said conduit, the material being forced through said conduit solely by the action of the walls of the groove on the material in the groove.

24. An apparatus for treating a liquid or semi-liquid material to change its condition, which includes means for continuously advancing in parallelism a plurality of endless conveyors to form an elongated conduit open only at its ends, means for continuously delivering the material under pressure directly into contact with said conveyors at one end of said conduit, means for subjecting one of said conveyors to the action of a temperature changing medium to reduce the viscosity of the material in said conduit to the point where it does not flow lengthwise of said conduit in respect to the conveyors under the pressure at which the material is delivered and whereby the material is advanced at the same rate as said conveyors, and means for delivering the hardened material from the end of said conduit as a substantially solid continuous body by the action of said conveyors.

CLARENCE W. VOGT.